United States Patent
Nong et al.

(10) Patent No.: US 11,073,189 B2
(45) Date of Patent: Jul. 27, 2021

(54) PRE-COMPRESSION TYPE EMERGENCY AIR SPRING ASSEMBLY

(71) Applicant: ZHUZHOU TIMES NEW MATERIAL TECHNOLOGY CO., LTD., Hunan (CN)

(72) Inventors: Duomin Nong, Hunan (CN); Te Ye, Hunan (CN); Canhui Chen, Hunan (CN); Haitao Cheng, Hunan (CN); Jun Zhou, Hunan (CN); Qiang Chen, Hunan (CN); Guoqi Duan, Hunan (CN); Qinghua Chen, Hunan (CN); Yaokun Long, Hunan (CN)

(73) Assignee: ZHUZHOU TIMES NEW MATERIAL TECHNOLOGY CO., LTD., Hunan (CN)

( * ) Notice: Subject to any disclaimer, the term of this patent is extended or adjusted under 35 U.S.C. 154(b) by 154 days.

(21) Appl. No.: 16/337,413

(22) PCT Filed: Aug. 2, 2018

(86) PCT No.: PCT/CN2018/098203
§ 371 (c)(1),
(2) Date: Mar. 28, 2019

(87) PCT Pub. No.: WO2019/080573
PCT Pub. Date: May 2, 2019

(65) Prior Publication Data
US 2020/0393014 A1 Dec. 17, 2020

(30) Foreign Application Priority Data
Oct. 27, 2017 (CN) .......................... 201711020033.2

(51) Int. Cl.
*F16F 9/04* (2006.01)
*F16F 13/00* (2006.01)
(Continued)

(52) U.S. Cl.
CPC .......... *F16F 9/0454* (2013.01); *F16F 13/002* (2013.01); *F16F 9/3207* (2013.01); *F16F 15/085* (2013.01)

(58) Field of Classification Search
CPC .. F16F 9/0454; F16F 9/049; F16F 9/05; F16F 9/052; F16F 9/3207; F16F 13/002; F16F 15/085
See application file for complete search history.

(56) References Cited

U.S. PATENT DOCUMENTS 4,294,175 A * 10/1981 Harsy ....................... B61F 5/16
105/199.3
4,690,388 A 9/1987 Harrison
(Continued)

FOREIGN PATENT DOCUMENTS

| CN | 202038318 | 11/2011 |
|---|---|---|
| CN | 203580971 | 5/2014 |

(Continued)

OTHER PUBLICATIONS

"International Search Report (Form PCT/ISA/210)", dated Oct. 11, 2018, pp. 1-5.

*Primary Examiner* — Melody M Burch
(74) *Attorney, Agent, or Firm* — JCIP Global Inc.

(57) ABSTRACT

A pre-compression type emergency air spring assembly includes an upper cover plate, an air bag, an upper end plate, and a lower end plate. A periphery of the upper end plate is connected with a periphery of the lower end plate through the air bag. A top part of the upper end plate is provided with transverse pre-compression cavities and transverse pre-compression plates arranged at transverse openings of the transverse pre-compression cavities. The transverse pre-compression cavities are internally provided with laminated spring elastomers through the transverse pre-compression plates in a pressing mode. Multiple steel springs are arranged
(Continued)

between the upper cover plate and the upper end plate in a pressing mode along a circumferential direction of the laminated spring elastomers. The upper cover plate is arranged on a periphery of the transverse pre-compression cavities in a sleeving mode.

8 Claims, 1 Drawing Sheet

(51) Int. Cl.
 *F16F 9/32* (2006.01)
 *F16F 15/08* (2006.01)

(56) References Cited

U.S. PATENT DOCUMENTS

| | | | | |
|---|---|---|---|---|
| 5,111,735 | A * | 5/1992 | Johnson | B60G 17/052 91/433 |
| 5,356,075 | A * | 10/1994 | Heide | B01D 1/20 239/222.11 |
| 5,575,360 | A * | 11/1996 | Gubitz | F16F 9/05 188/298 |
| 5,950,544 | A * | 9/1999 | Bieker | B61F 5/144 105/453 |
| 6,250,406 | B1 * | 6/2001 | Luke | E21B 17/105 175/325.2 |
| 6,595,483 | B2 * | 7/2003 | Cunningham | F16F 15/04 248/609 |
| 2002/0145239 | A1 * | 10/2002 | Yamaguchi | F16F 13/16 267/140.12 |
| 2012/0003413 | A1 * | 1/2012 | Lesage | B60C 1/0008 428/36.6 |
| 2015/0175176 | A1 * | 6/2015 | Sato | F16F 9/58 105/198.1 |
| 2020/0217387 | A1 * | 7/2020 | Nong | F16F 13/002 |

FOREIGN PATENT DOCUMENTS

| | | |
|---|---|---|
| CN | 107740832 | 2/2018 |
| CN | 207364166 | 5/2018 |
| GB | 1232121 | 5/1971 |

* cited by examiner

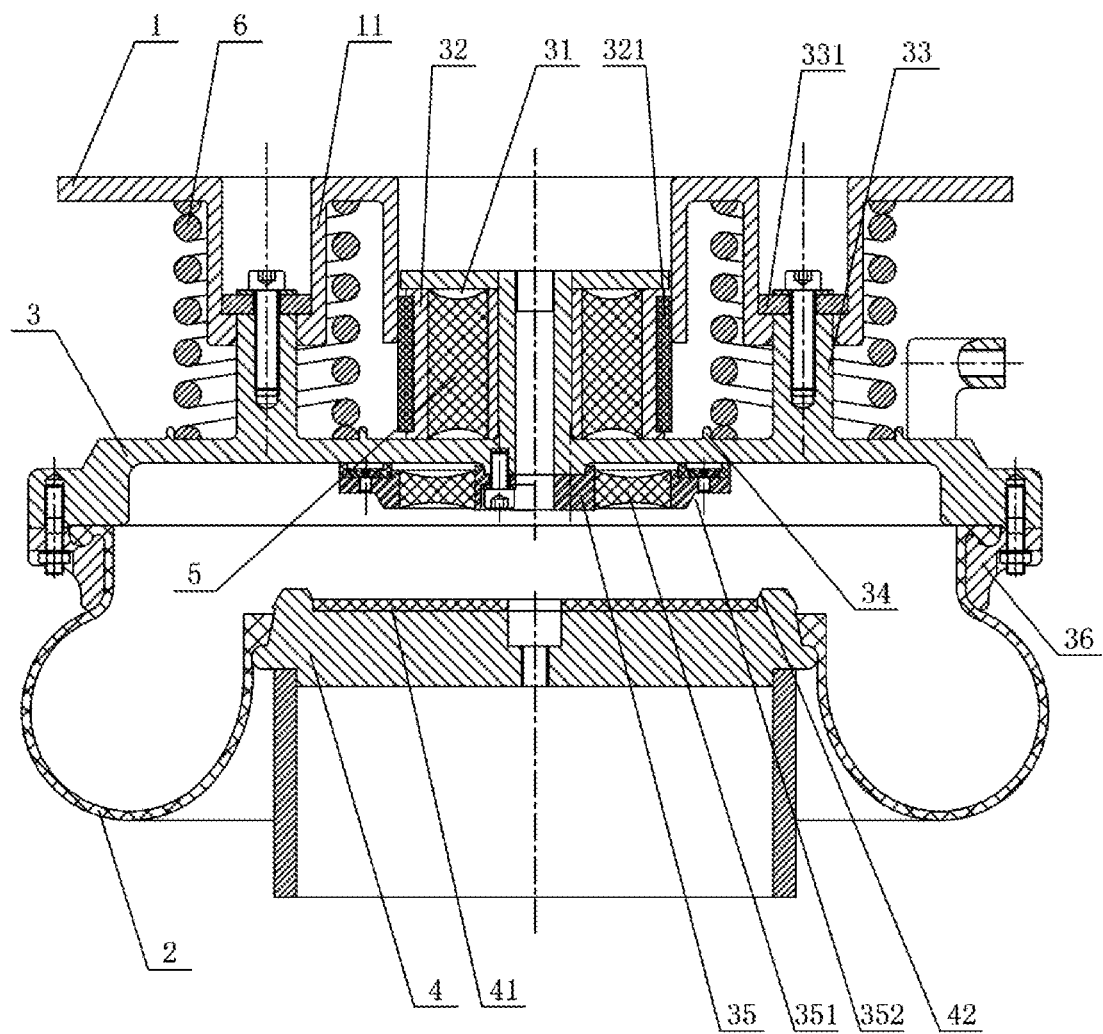

PRE-COMPRESSION TYPE EMERGENCY AIR SPRING ASSEMBLY

CROSS-REFERENCE TO RELATED APPLICATION

This is a 371 application of the International PCT application serial no. PCT/CN2018/098203, filed on Aug. 2, 2018 which claims the priority benefits of China Application No. 201711020033.2 filed on Oct. 27, 2017. The entirety of each of the above-mentioned patent applications is hereby incorporated by reference herein and made a part of this specification.

BACKGROUND

Technical Field

The invention mainly relates to the buffering and damping technology, more particularly relates to a pre-compression type emergency air spring assembly.

Description of Related Art

The air spring assembly is widely applied in railway cars, overload vehicles and other important buffering or damping occasions. Usually, this spring assembly comprises an elastomer located between a pair of rigid end plates. The elastomer is made of rubber, and compressed by loads acted on the spring assembly. In the prior art, the rubber emergency spring will generate creep deformation during the service life due to the characteristics of rubber, and meanwhile the vertical rigidity will increase due to the nonlinearity of rubber when loads are increased. In some high speed train projects, the emergency spring is required to have small vertical rigidity change, large dynamic displacement and no padding during the life. Thus, the existing rubber emergency spring cannot meet this requirement.

When the air spring is deflated, hard stop will be generated in the vertical direction generally, and meanwhile transverse sliding friction will occur between the cover plate and the wearing plate, which cannot meet the rigidity requirement and the soft stop requirement of some high speed train projects in the transverse direction in a deflated state.

SUMMARY

The objects in the invention is in view of the abovementioned problems of the prior art, and provide a pre-compression type emergency air spring assembly, which is simple in structure, convenient to install, low in heavy-load vertical rigidity, large in vertical deformation, high in comfort and stability, and is capable of preventing creep and achieving soft stop and the like.

To solve the aforesaid problems, the following technical solutions can be adopted:

A pre-compression type emergency air spring assembly comprises an upper cover plate, an air bag, an upper end plate, and a lower end plate. A periphery of the upper end plate is connected with a periphery of the lower end plate through the air bag. A top part of the upper end plate is provided with transverse pre-compression cavities and transverse pre-compression plates arranged at transverse openings of the transverse pre-compression cavities, and the transverse pre-compression cavities are internally provided with laminated spring elastomers through the transverse pre-compression plates in a pressing mode. Multiple steel springs are arranged between the upper cover plate and the upper end plate in a pressing mode along a circumferential direction of the laminated spring elastomers. The upper cover plate is arranged on a periphery of the transverse pre-compression cavities in the sleeving mode.

As further improvement of the above technical solution:

The transverse pre-compression plate is externally provided with a first wearing plate, and the upper cover plate is arranged on the periphery of the transverse pre-compression cavities in the sleeving mode and is in contact with the first wearing plate.

A bottom part of the upper cover plate is provided with multiple stop collars along the circumferential direction, and the top part of the upper end plate is provided with multiple limiting columns along the circumferential direction. Each limiting column is mutually sleeved with a corresponding one of the stop collars. The sleeving mode may be clearance fir, or connection by friction sleeve, so as to reduce a sliding friction force. Each steel spring is arranged on a periphery of the corresponding one of the stop collars and a corresponding one of the limiting columns in the sleeving mode.

A top part of the limiting column is provided with an anti-release table for preventing the stop collar from coming off, and the anti-release table is fastened with the limiting column by bolts.

The top part of the upper end plate is provided with a limiting table on a periphery of the steel spring.

A bottom part of the upper end plate is provided with a rubber elastomer, and a top part of the lower end plate is provided with a second wearing plate which is in contact with the rubber elastomer in a deflated state.

A transverse stop elastomer is vulcanized on the rubber elastomer as transverse soft stop in the deflated state.

The top part of the lower end plate is provided with transverse stop tables on both sides of the second wearing plate, and both sides of the rubber elastomer are provided with transverse stop slots which are coordinated with the transverse stop tables.

A bottom part of an outer peripheral face of the upper end plate is provided with a retaining ring. One end of the air bag is buckled with the retaining ring, and the other end of the air bag is in self-sealing connection with the lower end plate.

Compared with the prior art, the invention has the following advantages.

The pre-compression type emergency air spring assembly of the present invention comprises the upper cover plate, the air bag, the upper end plate, and the lower end plate. The periphery of the upper end plate is connected with the periphery of the lower end plate through the air bag. The top part of the upper end plate is provided with transverse pre-compression cavities and transverse pre-compression plates arranged at the transverse openings of the transverse pre-compression cavities, and the transverse pre-compression cavities are internally provided with laminated spring elastomers through the transverse pre-compression plates in a pressing mode. Multiple steel springs are arranged between the upper cover plate and the upper end plate in the pressing mode along the circumferential direction of the laminated spring elastomers. The upper cover plate is arranged on the periphery of the transverse pre-compression cavities in the sleeving mode. In this structure, multiple steel springs are provided outside of the laminated spring elastomer in the circumferential direction to form a parallel structure which is simple in structure and convenient to install; moreover, the upper cover plate is sleeved on the periphery of the transverse pre-compression cavity to move up and down, so that all the vertical rigidity is provided by the steel spring, and a damping force is provided by the laminated spring elastomer. The damping force can be controlled by regulating the displacement of the transverse pre-compression plate, i.e. pre-compression of the laminated spring elastomer. It can prevent the system from creep, regulate damping, decrease the nonlinearity, and improve the dynamic displacement capability. The steel spring initially forms pre-compression, and such a parallel structure with pre-compression can greatly reduce the heavy-load vertical rigidity of the secondary spring, and improve the comfort of a heavy-load train. It can provide transverse rigidity for the system in the deflated state to act as transverse soft stop, and meanwhile realize vertical rigid contact to act as vertical hard stop.

BRIEF DESCRIPTION OF THE DRAWINGS

FIG. 1 is a structure diagram of the present invention.

DESCRIPTION OF THE EMBODIMENTS

The invention will be further clarified based on the following figures and embodiments.

As shown in FIG. 1, an embodiment of the pre-compression type emergency air spring assembly of the present invention comprises an upper cover plate 1, an air bag 2, an upper end plate 3, and a lower end plate 4. A periphery of the upper end plate 3 is connected with a periphery of the lower end plate 4 through the air bag 2. A top part of the upper end plate 3 is provided with transverse pre-compression cavities 31 and transverse pre-compression plates 32 arranged at transverse openings of the transverse pre-compression cavities 31, and the transverse pre-compression cavities 31 are internally provided with laminated spring elastomers 5 through the transverse pre-compression plates 32 in a pressing mode. Multiple steel springs 6 are arranged between the upper cover plate 1 and the upper end plate 3 in a pressing mode along a circumferential direction of the laminated spring elastomers 5. The upper cover plate 1 is arranged on a periphery of the transverse pre-compression cavities 31 in a sleeving mode. In this structure, multiple steel springs 6 are provided outside of the laminated spring elastomer 5 in the circumferential direction to form a parallel structure which is simple in structure and convenient to install. Moreover, the upper cover plate 1 is sleeved on the periphery of the transverse pre-compression cavity 31 to move up and down, so that all the vertical rigidity is provided by the steel spring 6, and a damping force is provided by the laminated spring elastomer 5. The damping force can be controlled by regulating the displacement of the transverse pre-compression plate 32, i.e. pre-compression of the laminated spring elastomer 5. It can prevent the laminated spring elastomer 5 from creep, regulate damping, decrease the nonlinearity, and improve the dynamic displacement capability. The steel spring 6 initially forms pre-compression, and such a parallel structure with pre-compression can greatly reduce the heavy-load vertical rigidity of the secondary spring, and improve the comfort of a heavy-load train. It can provide transverse rigidity for the system in a deflated state to act as transverse soft stop, and meanwhile realize vertical rigid contact to act as vertical hard stop.

In this embodiment, the transverse pre-compression plate 32 is externally provided with a first wearing plate 321, and the upper cover plate 1 is arranged on the periphery of the transverse pre-compression cavities 31 in the sleeving mode and is in contact with the first wearing plate 321. In this structure, the laminated spring elastomer 5 has pre-compression, and the first wearing plate 321 and the upper cover plate 1 can slide relatively. A sliding friction force is the damping force of the emergency spring, and the damping can be regulated by regulating the pre-compression of the laminated spring elastomer 5 before installation, so as to effectively attenuate vibration of the system. In the meantime, the first wearing plate 321 of the laminated spring can improve friction life and reduce noise.

In this embodiment, a bottom part of the upper cover plate 1 is provided with multiple stop collars 11 along the circumferential direction, and the top part of the upper end plate 3 is provided with multiple limiting columns 33 along the circumferential direction. Each limiting column 33 is mutually sleeved with a corresponding one of the stop collars 11. The sleeving mode may be clearance fit, or connection by friction sleeve, so as to reduce the sliding friction force. Each steel spring 6 is arranged on the periphery of the corresponding one of the stop collars 11 and a corresponding one of the limiting columns 33 in the sleeving mode. The stop collar 11 is used in conjunction with the limiting column 33, so as to make the upper cover plate 1 move up and down, restrict and limit the transverse displacement to prevent transverse deformation.

In this embodiment, a top part of the limiting column 33 is provided with an anti-release table 331 for preventing the stop collar 11 from coming off, and the anti-release table 331 is fastened with the limiting column 33 by bolts. The anti-release table 331 is used for preventing the stop collar 11 from coming off from the top part of the limiting column 33 during rising, so as to improve the reliability of the whole structure.

In this embodiment, the top part of the upper end plate 3 is provided with a limiting table 34 on a periphery of the steel spring 6. The limiting table 34 transversely restricts and limits the steel spring 6 on its periphery, so as to prevent transverse deformation.

In this embodiment, a bottom part of the upper end plate 3 is provided with a rubber elastomer 35, and a top part of the lower end plate 4 is provided with a second wearing plate 41 which is in contact with the rubber elastomer 35 in the deflated state. In the deflated state, the rubber elastomer 35 and the second wearing plate 41 are in hard contact to restrict the vertical displacement of the upper end plate 3 and the lower end plate 4. The transverse stop elastomer 351 is acted as transverse soft stop in the deflated state.

In this embodiment, the top part of the lower end plate 4 is provided with transverse stop tables 42 on both sides of the second wearing plate 41, and both sides of the rubber elastomer 35 are provided with transverse stop slots 352 which are coordinated with the transverse stop tables 42. In the deflated state, after a train slides a certain distance, the transverse stop table 42 of the lower end plate 4 is in contact with the transverse stop slot 352 of the rubber elastomer 35, thus the rubber elastomer 35 provides transverse rigidity and soft stop for the system, to draw back the train when passing through the small curve, and ensure the safety of the train in the deflated state.

In this embodiment, a bottom part of an outer peripheral face of the upper end plate 3 is provided with a retaining ring 36. One end of the air bag 2 is buckled with the retaining ring 36, and the other end of the air bag 2 is in self-sealing connection with the lower end plate 4. In this structure, a small opening of the air bag 2 is in self-sealing connection with the lower end plate 4, to prevent air leakage.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. A pre-compression emergency air spring assembly, comprising an upper cover plate, an air bag, an upper end plate and a lower end plate, wherein a periphery of the upper end plate is connected with a periphery of the lower end plate through the air bag; a top part of the upper end plate is provided with transverse pre-compression cavities and transverse pre-compression plates arranged at transverse openings of the transverse pre-compression cavities, and the transverse pre-compression cavities are internally provided with laminated spring elastomers through the transverse pre-compression plates in a pressing mode; multiple steel springs are arranged between the upper cover plate and the upper end plate in a pressing mode along a circumferential direction of the laminated spring elastomers; and the upper cover plate is arranged on a periphery of the transverse pre-compression cavities in a sleeving mode, wherein a bottom part of the upper end plate is provided with a rubber elastomer, and a top part of the lower end plate is provided with a first wearing plate which is in contact with the rubber elastomer in a deflated state, wherein a transverse stop elastomer is installed on the rubber elastomer as transverse stop in the deflated state.

2. The pre-compression emergency air spring assembly according to claim 1, wherein each of the transverse pre-compression plates is externally provided with a second wearing plate, and the upper cover plate is arranged on the periphery of the transverse pre-compression cavities in the sleeving mode and is in contact with the second wearing plate.

3. The pre-compression emergency air spring assembly according to claim 2, wherein the bottom part of the upper cover plate is provided with multiple stop collars along the circumferential direction, and the top part of the upper end plate is provided with multiple limiting columns along the circumferential direction; each limiting column is mutually sleeved with a corresponding one of the stop collars; the sleeving mode is clearance fit, or connection by friction sleeve, so as to reduce a sliding friction force; each steel spring is arranged on a periphery of the corresponding one of the stop collars and a corresponding one of the limiting columns in the sleeving mode.

4. The pre-compression emergency air spring assembly according to claim 3, wherein a top part of each limiting column is provided with an anti-release table for preventing the corresponding one of the stop collars from coming off, and the anti-release table is fastened with the limiting column by bolts.

5. The pre-compression emergency air spring assembly according to claim 4, wherein the top part of the upper end plate is provided with a limiting table on a periphery of each of the steel spring.

6. The pre-compression emergency air spring assembly according to claim 1, wherein the top part of the lower end plate is provided with transverse stop tables on both sides of the first wearing plate, and both sides of the rubber elastomer are provided with transverse stop slots which are coordinated with the transverse stop tables.

7. The pre-compression emergency air spring assembly according to claim 1, wherein a bottom part of an outer peripheral face of the upper end plate is provided with a retaining ring; one end of the air bag is buckled with the retaining ring, and the other end of the air bag is in self-sealing connection with the lower end plate.

8. The pre-compression emergency air spring assembly according to claim 6, wherein a bottom part of an outer peripheral face of the upper end plate is provided with a retaining ring; one end of the air bag is buckled with the retaining ring, and the other end of the air bag is in self-sealing connection with the lower end plate.

* * * * *